United States Patent
Long et al.

(10) Patent No.: US 12,320,927 B2
(45) Date of Patent: Jun. 3, 2025

(54) RANGING DEVICE AND MOBILE PLATFORM

(71) Applicant: SZ DJI TECHNOLOGY CO., LTD., Shenzhen (CN)

(72) Inventors: Chenghui Long, Shenzhen (CN); Yijun Luo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 992 days.

(21) Appl. No.: 17/377,749

(22) Filed: Jul. 16, 2021

(65) Prior Publication Data

US 2021/0341580 A1 Nov. 4, 2021

Related U.S. Application Data

(63) Continuation of application No. PCT/CN2019/072245, filed on Jan. 17, 2019.

(51) Int. Cl.
*G01S 7/484* (2006.01)
*G01S 7/481* (2006.01)
(Continued)

(52) U.S. Cl.
CPC ............ *G01S 7/484* (2013.01); *G01S 7/4817* (2013.01); *G01S 7/4865* (2013.01); *G01S 17/42* (2013.01); *G01S 17/10* (2013.01)

(58) Field of Classification Search
None
See application file for complete search history.

(56) References Cited

U.S. PATENT DOCUMENTS 3,620,626 A * 11/1971 Daly ...................... G01S 17/42
                                                          398/151
9,121,703 B1 * 9/2015 Droz ...................... G01S 17/42
(Continued)

FOREIGN PATENT DOCUMENTS

CN          101216562 A        7/2008
CN          101344591 A        1/2009
(Continued)

OTHER PUBLICATIONS

The World Intellectual Property Organization (WIPO) International Search Report for PCT/CN2019/072245 Oct. 24, 2019 6 pages (translation included).

*Primary Examiner* — Eric L Bolda
(74) *Attorney, Agent, or Firm* — ANOVA LAW GROUP, PLLC (57) ABSTRACT

A ranging device includes a transmitter, a scanner including an optical element, and a detector. Working states of the ranging device after power-on include a normal state and a standby state. In the normal state, the transmitter transmits a light pulse sequence, the optical element is kept in a motion state to change the light pulse sequence to different directions to emit at different moments, and the detector receives at least part of reflected light reflected by an object and converts the at least part of the reflected light into an electrical signal, and determines at least one of a distance or an orientation of the object with respect to the ranging device according to the electrical signal. In the normal state, the transmitter suspends transmitting the light pulse sequence and the optical element is kept in the motion state.

19 Claims, 4 Drawing Sheets

(51) Int. Cl.
   *G01S 7/4865*   (2020.01)
   *G01S 17/10*    (2020.01)
   *G01S 17/42*    (2006.01)

(56) References Cited

U.S. PATENT DOCUMENTS

| | | | |
|---|---|---|---|
| 2005/0168720 A1* | 8/2005 | Yamashita | G01S 7/4817 356/5.01 |
| 2008/0278715 A1* | 11/2008 | Swenson | G01S 7/483 356/141.5 |
| 2015/0124242 A1 | 5/2015 | Pierce et al. | |
| 2016/0259038 A1 | 9/2016 | Laumeyer et al. | |
| 2016/0356890 A1* | 12/2016 | Fried | G01S 7/4863 |
| 2018/0259645 A1* | 9/2018 | Shu | G01S 7/4866 |

FOREIGN PATENT DOCUMENTS

| | | |
|---|---|---|
| CN | 104406529 A | 3/2015 |
| CN | 205982639 U | 2/2017 |
| CN | 107329132 A | 11/2017 |
| CN | 108693537 A | 10/2018 |
| CN | 108700653 A | 10/2018 |

* cited by examiner

RANGING DEVICE AND MOBILE PLATFORM

CROSS-REFERENCE TO RELATED APPLICATION

This application is a continuation of International Application No. PCT/CN2019/072245, filed Jan. 17, 2019, the entire content of which is incorporated herein by reference.

TECHNICAL FIELD

The present disclosure relates to the technical field of ranging device and, more particularly, to a ranging device and a mobile platform.

BACKGROUND

A ranging device, such as a Lidar, is a perception system of the outside world. In an example of the Lidar based on time of flight (TOF) principle, the Lidar transmits a pulse outward, and receives an echo generated by reflection of an external object. Distance between the object and the Lidar in transmission direction can be calculated through measurement of time delay of the echo. Distance information between objects in different orientations and the Lidar can be measured through dynamic adjustment of emitting direction of laser, so as to realize modeling of three-dimensional space.

There are many application scenarios for the Lidar in actual use. If the Lidar only has a normal working state, it will still be in normal operation in some scenes that do not need to be detected, which will reduce use efficiency of the Lidar.

Therefore, it is needed to improve the ranging device in view of the existence of the problem described above.

SUMMARY

In accordance with the disclosure, there is provided a ranging device including a transmitter, a scanner including an optical element, and a detector. Working states of the ranging device after power-on include a normal state and a standby state. In the normal state, the transmitter transmits a light pulse sequence, the optical element is kept in a motion state to change the light pulse sequence to different directions to emit at different moments, and the detector receives at least part of reflected light reflected by an object and converts the at least part of the reflected light into an electrical signal, and determines at least one of a distance or an orientation of the object with respect to the ranging device according to the electrical signal. In the standby state, the transmitter suspends transmitting the light pulse sequence and the optical element is kept in the motion state.

Also in accordance with the disclosure, there is provided a mobile platform including a platform body and a ranging device mounted at the platform body and including a transmitter, a scanner including an optical element, and a detector. Working states of the ranging device after power-on include a normal state and a standby state. In the normal state, the transmitter transmits a light pulse sequence, the optical element is kept in a motion state to change the light pulse sequence to different directions to emit at different moments, and the detector receives at least part of reflected light reflected by an object and converts the at least part of the reflected light into an electrical signal, and determines at least one of a distance or an orientation of the object with respect to the ranging device according to the electrical signal. In the standby state, the transmitter suspends transmitting the light pulse sequence and the optical element is kept in the motion state.

BRIEF DESCRIPTION OF THE DRAWINGS

In order to explain the technical solutions in the embodiments of the present disclosure more clearly, reference is made to the accompanying drawings, which are used in the description of the embodiments. Obviously, the drawings in the following description are some embodiments of the present disclosure, and other drawings can be obtained from these drawings without any inventive effort for those of ordinary skill in the art.

DETAILED DESCRIPTION OF THE EMBODIMENTS

In order to make the objectives, technical solutions, and advantages of the present disclosure more obvious, exemplary embodiments according to the present disclosure will be described in detail below with reference to the accompanying drawings. Obviously, the described embodiments are some of rather than all the embodiments of the present disclosure. It should be noted that the present disclosure is not limited by the exemplary embodiments described herein. Based on the embodiments of the present disclosure described in the present disclosure, all other embodiments obtained by those of ordinary skill in the art without inventive effort shall fall within the scope of the present disclosure.

In the following description, a lot of specific details are given in order to provide a more thorough understanding of the present disclosure. However, it is obvious to those skilled in the art that the present disclosure can be implemented without one or more of these details. In some other examples, some technical features known in the art are not described in order to avoid confusion with the present disclosure.

It should be noted that the present disclosure can be implemented in different forms and should not be construed as being limited to the embodiments described here. Rather, these embodiments are provided so that the disclosure will be thorough and complete, and the scope of the present disclosure will be fully conveyed to those skilled in the art.

The terms used herein is for the purpose of describing specific embodiments only and is not as a limitation of the present disclosure. As used herein, the singular forms of "a," "an," and "the" are intended to include plural forms as well, unless the context clearly indicates otherwise. It should also be understood that the terms "comprising," and/or "including," when used in this specification, determine the existence of the described features, integers, steps, operations, elements and/or components, but do not exclude the existence or addition of one or more other features, integers, steps, operations, elements, components, and/or groups. As used herein, the term "and/or" includes any and all combinations of related listed items.

A ranging device is a sensor configured to detect external environment to obtain distance between an object in the external environment and the ranging device. In actual use, the ranging device itself is started and stabilized for a certain amount of time. In order to quickly start the ranging device and/or to maintain the lowest power consumption when the ranging device is not working, the ranging device herein is provided with different working states, so as to improve actual use efficiency of the ranging device and extend service life of the ranging device.

Distance and orientation detected by a ranging device 200 can be used for remote sensing, obstacle avoidance, surveying and mapping, modeling, navigation, etc. In some embodiments, the ranging device according to the embodiments of the present disclosure can be applied to a mobile platform, and the ranging device can be mounted at a platform body of the mobile platform. The mobile platform with the ranging device can measure the external environment, for example, to measure distance between the mobile platform and an obstacle for obstacle avoidance and other purposes, and to perform two-dimensional or three-dimensional surveying and mapping of the external environment. In some embodiments, the mobile platform includes at least one of an unmanned aerial vehicle, a car, a remote control vehicle, a robot, or a camera. When the ranging device is applied to an unmanned aerial vehicle, the platform body is a vehicle body of the unmanned aerial vehicle. When the ranging device is applied to a car, the platform body is a vehicle body of the car. The car can be a self-driving car or a semi-self-driving car, which is not limited here. When the ranging device is applied to a remote control vehicle, the platform body is a vehicle body of the remote control vehicle. When the ranging device is applied to a robot, the platform body is the robot. When the ranging device is applied to a camera, the platform body is the camera itself.

The present disclosure provides a ranging device, which includes a transmitter, a scanner, and a detector. The transmitter is configured to transmit a light pulse sequence; the detector is configured to receive at least part of reflected light reflected by an object and convert into an electrical signal, and determine distance and/or orientation between the object and the ranging device according to the electrical signal; the scanner includes an optical element that can change transmission direction of light beam.

The working states of the ranging device after power-on includes a standby state and a normal state. In the normal state: the transmitter is configured to transmit the light pulse sequence; the optical element in the scanner is kept in a motion state, so as to change the light pulse sequence to different directions to emit at different moments; the detector is configured to receive at least part of the reflected light reflected by the object and convert into the electrical signal, and determine the distance and/or orientation of the object with respect to the ranging device according to the electrical signal. In the standby state: the transmitter suspends transmitting the light pulse sequence; the optical element in the scanner is kept in the motion state.

The ranging device may be an electronic apparatus such as a Lidar or a laser ranging apparatus. In some embodiments, the ranging device is configured to sense external environment information, such as distance information, orientation information, reflection intensity information, speed information, etc. of an environmental target. In one implementation manner, the ranging device can detect distance of a to-be-detected object (also referred to as a "target object") to the ranging device by measuring time of light propagation, that is, time-of-flight (TOF), between the ranging device and the to-be-detected object. The ranging device can also detect the distance from the to-be-detected object to the ranging device by other techniques, such as a ranging method based on phase shift measurement or a ranging method based on frequency shift measurement, which is not limited herein.

For better understanding, the ranging device will be described with examples in conjunction with the accompanying drawings.

Figure 1:
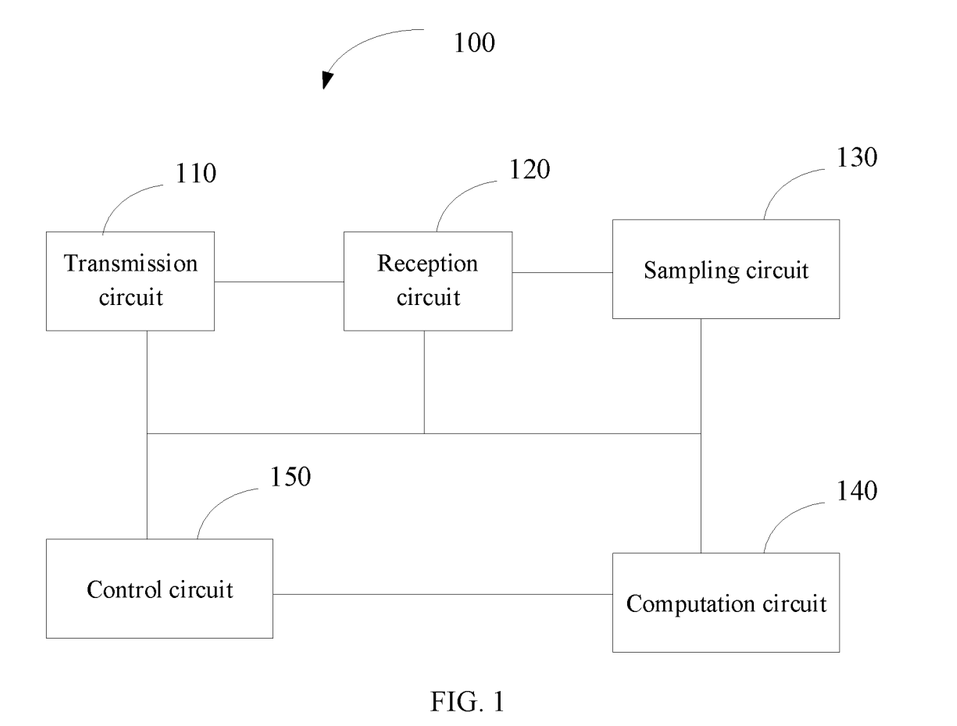
FIG. 1 shows a partial schematic diagram of a ranging device according to an embodiment of the present disclosure.

As shown in FIG. 1, a ranging device 100 includes the transmitter and the detector. The transmitter includes a transmission circuit 110, and the detector includes a reception circuit 120, a sampling circuit 130, and a computation circuit 140.

The transmission circuit 110 can emit a light pulse sequence (e.g., a laser pulse sequence). The reception circuit 120 can receive the light pulse sequence reflected by a to-be-detected object and perform photoelectric conversion on the light pulse sequence to obtain an electrical signal, and then the electrical signal is processed and output to the sampling circuit 130. The sampling circuit 130 can sample the electrical signal to obtain a sampling result. The computation circuit 140 can determine distance between the ranging device 100 and the to-be-detected object based on the sampling result of the sampling circuit 130.

For example, the ranging device 100 also includes a control circuit 150, which can control other circuits, for example, can control operation time of each circuit and/or set parameters for each circuit.

It should be noted that although the ranging device shown in FIG. 1 includes a transmission circuit, a reception circuit, a sampling circuit, and a computation circuit, and is configured to emit a light beam for detection, the embodiments of the present disclosure are not limited thereto. Number of any one of the transmission circuit, the reception circuit, the sampling circuit, and the computation circuit may also be at least two, which are configured to emit at least two light beams in same direction or in different directions. The at least two light beams may be emitted simultaneous or may be emitted at different times. In some embodiments, the transmission circuit includes at least two laser emitters arranged at the same circuit board. In some embodiments, light emitting chips in the at least two transmission circuits are packaged in same module. For example, each transmission circuit includes a laser emitting chip, and dies of the laser emitting chips in the at least two transmission circuits are packaged together and housed in same package space.

In some implementations, in addition to the circuits shown in FIG. 1, the ranging device 100 may also include a scanner for changing propagation direction of at least one light pulse sequence emitted by the transmission circuit.

A module including the transmission circuit 110, the reception circuit 120, the sampling circuit 130, and the computation circuit 140, or a module including the transmission circuit 110, the reception circuit 120, the sampling circuit 130, the computation circuit 140, and the control circuit 150 may be referred to as a ranging module. The ranging module can be set apart from the scanner, so as to prevent the scanner from being transmitted to the ranging module due to vibration of motion devices, and to prevent the transmitter from affecting measurement accuracy of the ranging module.

Figure 2:
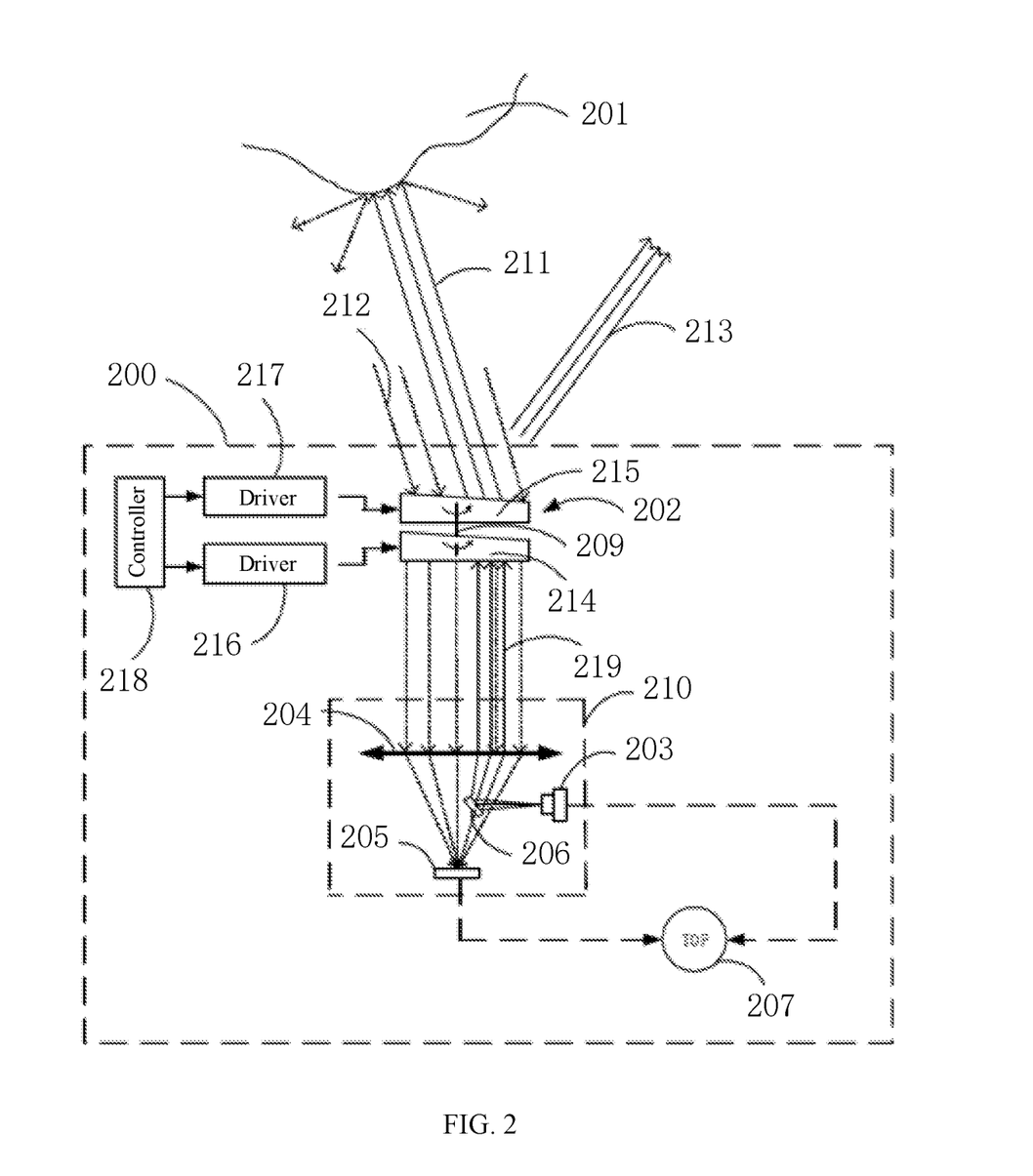
FIG. 2 shows a schematic diagram of a ranging device according to an embodiment of the present disclosure.

A coaxial light path can be used in the ranging device, that is, the light beam emitted by the ranging device and the reflected light beam share at least part of the light path within the ranging device. For example, after at least one laser pulse sequence emitted by the transmission circuit changes its propagation direction and emits through the scanner, the laser pulse sequence reflected by the to-be-detected object passes through the scanner and then enters the reception circuit. An off-axis light path can also be used in the ranging device, that is, the light beam emitted by the ranging device and the reflected light beam are respectively transmitted along different light paths within the ranging device. FIG. 2 shows a schematic diagram of a ranging device using a coaxial light path according to an embodiment of the present disclosure.

A ranging device 200 includes a ranging module 210, which includes a transmitter 203 (which may include the transmission circuit described above), a collimator 204, a detector 205 (which may include the reception circuit, the sampling circuit, and the computation circuit described above), and a light path changing element 206. The ranging module 210 is configured to emit the light beam, receive the reflected light, and convert the reflected light into the electrical signal. The transmitter 203 can be configured to emit the light sequence. In some embodiments, the transmitter 203 may emit the laser pulse sequence. For example, a laser beam emitted by the transmitter 203 is a narrow-bandwidth beam with a wavelength outside visible light range. The collimator 204 is arranged on the transmission light path of the transmitter, and is configured to collimate the light beam emitted from the transmitter 203 and collimate the light beam emitted from the transmitter 203 into parallel light output to the scanner. The collimator is also configured to converge at least part of the reflected light reflected by the to-be-detected object. The collimator 204 may be a collimating lens or another element capable of collimating the light beam.

In the embodiments shown in FIG. 2, the transmission light path and the reception light path within the ranging device are merged before the collimator 204 by the light path changing element 206, so that the transmission light path and the reception light path can share the same collimator, which makes the light path more compact. In some other implementations, the transmitter 203 and the detector 205 may respectively use their own collimators, and the light path changing element 206 is arranged on the light path behind the collimator.

In the embodiment shown in FIG. 2, since beam aperture of the light beam emitted by the transmitter 203 is small, and beam aperture of the reflected light received by the ranging device is large, the light path changing element can use a small-area reflector to merge the transmission light path and the reception light path. In some other implementations, the light path changing element may also use a reflector with a through hole, where the through hole is used to transmit emitted light of the transmitter 203 and the reflector is used to reflect the reflected light to the detector 205, which can reduce block of the reflected light from a support of a small reflector in case of using the small reflector.

In the embodiments shown in FIG. 2, the light path changing element is deviated from an optical axis of the collimator 204. In some other implementations, the light path changing element may also be located on the optical axis of the collimator 204.

The ranging device 200 also includes a scanner 202 arranged on the transmission light path of the ranging module 210. The scanner 202 is configured to change transmission direction of a collimated light beam 219 emitted by the collimator 204 and project it to external environment. The reflected light is projected to the collimator 204, and is converged on the detector 205 through the collimator 204.

In some embodiments, the scanner 202 may include at least an optical element for changing propagation path of the light beam, and the optical element may change the propagation path of the light beam by reflecting, refracting, diffracting, etc. For example, the scanner 202 includes a lens, a reflector, a prism, a galvanometer, a grating, a liquid crystal, an optical phased array, or any combination of the above. In some embodiments, at least some of the optical elements are movable, for example, the at least some of the optical elements are driven to move by a driver, and the movable optical element can reflect, refract or diffract the light beam to different directions at different times. In some embodiments, the multiple optical elements of the scanner 202 can rotate or vibrate around a common rotation axis 209, and each rotating or vibrating optical element is configured to continuously change the propagation direction of an incident light beam. In some embodiments, the multiple optical elements of the scanner 202 may rotate at different rotation speeds or vibrate at different speeds. In some other embodiments, the at least some of the optical elements of the scanner 202 may rotate at substantially the same rotation speed. In some embodiments, the multiple optical elements of the scanner may also rotate around different axes. In some embodiments, the multiple optical elements of the scanner may also rotate in the same direction or in different directions; or vibrate in the same direction or in different directions, which is not limited herein.

In some embodiments, the scanner 202 includes a first optical element 214 and a driver 216 connected to the first optical element 214. The driver 216 is configured to drive the first optical element 214 to rotate around the rotation axis 209, such that the first optical element 214 changes the direction of the collimated light beam 219, and the first optical element 214 projects the collimated light beam 219 to different directions. In some embodiments, angle between the direction of the collimated light beam 219 changed by the first optical element and the rotation axis 209 varies with the rotation of the first optical element 214. In some embodiments, the first optical element 214 includes a pair of opposing non-parallel surfaces through which the collimated light beam 219 passes. In some embodiments, the first optical element 214 includes a prism that varies in thickness along at least a radial direction. In some embodiments, the first optical element 214 includes a wedge angle prism that refracts the collimated light beam 219.

In some embodiments, the scanner 202 also includes a second optical element 215 that rotates around the rotation axis 209, and the rotation speed of the second optical element 215 is different from the rotation speed of the first optical element 214. The second optical element 215 is configured to change the direction of the light beam projected by the first optical element 214. In some embodiments, the second optical element 215 is connected to another driver 217 that drives the second optical element 215 to rotate. The first optical element 214 and the second optical element 215 can be driven by the same or different drivers, so that the rotation speed and/or rotation direction of the first optical element 214 and the second optical element 215 are different, thereby projecting the collimated light beam 219 to different directions in outside space, and a larger space can be scanned. In some embodiments, a controller 218 controls the drivers 216 and 217 to drive the first optical element 214 and the second optical element 215, respectively. The rotation speeds of the first optical element 214 and the second optical element 215 may be determined according to area and pattern expected to be scanned in actual applications. The drivers 216 and 217 may include motors or other drivers.

In some embodiments, the second optical element 215 includes a pair of opposing non-parallel surfaces through which the light beam passes. In some embodiments, the second optical element 215 includes a prism that varies in thickness along at least a radial direction. In some embodiments, the second optical element 215 includes a wedge angle prism.

In some embodiments, the scanner 202 also includes a third optical element (not shown) and a driver for driving the third optical element to move. For example, the third optical element includes a pair of opposing non-parallel surfaces through which the light beam passes. In some embodiments, the third optical element includes a prism that varies in thickness along at least a radial direction. In some embodiments, the third optical element includes a wedge angle prism. At least two of the first, second, and third optical elements rotate at different rotation speeds and/or rotation directions.

Each optical element in the scanner 202 can rotate to project light to different directions, such as directions of projected light 211 and projected light 213, so that a space around the ranging device 200 is scanned. When the projected light 211 projected by the scanner 202 hits a to-be-detected object 201, part of the light is reflected by the to-be-detected object 201 to the ranging device 200 in a direction opposite to the projected light 211. Reflected light 212 reflected by the to-be-detected object 201 is incident to the collimator 204 after passing through the scanner 202.

The detector 205 and the transmitter 203 are arranged on the same side of the collimator 204, and the detector 205 is configured to convert at least part of the reflected light passing through the collimator 204 into an electrical signal.

In some embodiments, each optical element is plated with an anti-reflection coating. For example, thickness of the anti-reflection coating is equal to or close to wavelength of the light beam emitted by the transmitter 203, which can increase intensity of the transmitted light beam.

In some embodiments, a filter layer is plated on an element surface located on beam propagation path in the ranging device, or a filter is provided on the beam propagation path, which is configured to at least transmit wavelength band of the beam emitted by the transmitter and reflect other wavelength bands, so as to reduce noise caused by ambient light to receiver.

In some embodiments, the transmitter 203 may include a laser diode, and emit a nanosecond level laser pulse through the laser diode. Further, laser pulse receiving time can be determined, for example, by detecting rising edge time and/or falling edge time of an electrical signal pulse. As such, the ranging device 200 can calculate time of flight (TOF) using pulse receiving time information and pulse sending time information, so as to determine the distance between the to-be-detected object 201 and the ranging device 200.

For example, the ranging device also includes a communication circuit configured to communicate with another device other than the ranging device. For example, the communication circuit may receive a control instruction, a synchronization instruction, or another type of instruction from another device (such as a control system on a car).

In some embodiments, a ranging system includes a plurality of ranging devices and a control device (also referred to as a central panel in some scenarios) connected to the plurality of devices. The control device can receive status information and/or obtained point cloud data from each ranging device. After receiving the point cloud data of the plurality of ranging devices, the control device can combine the point cloud data to obtain point cloud data in same coordinate system. The control device can configure each ranging device according to a user instruction (such as an instruction from a control system on a car or another mobile platform). The communication circuit in the ranging device can communicate with the control device in the ranging system.

The ranging device of the present disclosure can have a variety of working states after power-on, some of which are described below with examples.

In some embodiments, the working states of the ranging device include an initialization state. In the initialization state, the ranging device starts the driver to move, so as to drive the optical element to move. For example, in an example where the driver includes a motor, the motor is started in the initialization state of the ranging device.

In some embodiments, the working states of the ranging device include a normal state. In the normal state, the ranging device can work normally and can generate point cloud data. Specifically, the transmitter in the ranging device is configured to transmit the light pulse sequence; the optical element in the scanner is kept in a motion state, so as to change the light pulse sequence to different directions to emit at different moments; the detector is configured to receive at least part of the reflected light reflected by the object and convert the light into the electrical signal, and determine the distance and/or orientation of the object with respect to the ranging device according to the electrical signal. For example, other modules in the ranging device may also be in a normal working state.

In some embodiments, the working states of the ranging device include a standby state. In the standby state, the transmitter in the ranging device suspends transmitting the light pulse sequence, but the driver in the scanner keeps working and keeps the optical element in a motion state. In this way, service life of the transmitter can be extended, and power of the ranging device can be kept as low as possible, while the driver is kept in operation. Since a process from power-on to start sampling with stable rotation speed of the driver is relatively long, the standby state can ensure a quick switch to the normal state with minimal power consumption.

In some embodiments, the working states of the ranging device include a low power consumption state. In the low power consumption state of the ranging device, at least some modules in the ranging device are in the low power consumption state. For example, power of at least some modules in the low power consumption state is lower than the power in the normal state. For example, power of at least one module other than the communication circuit in the ranging device in the low power consumption state is lower than the power in the normal state. The ranging device can maintain communication function with an external module through the communication circuit, so that the external module can manage the ranging device. For example, power of at least part of the ranging device working in the low power consumption state is lower than the power in the normal state. For example, static current of an analog circuit in the ranging device in the low power consumption state is much smaller than the static current in the normal state. As another example, an operating clock frequency of a digital circuit in the ranging device in the low power consumption state is much lower than the operating clock frequency in the normal state.

In some embodiments, the working states of the ranging device include an error state. In the error state of the ranging device, at least some sensors and elements stop working. In some scenarios, the error state may also be referred to as an abnormal state. For example, in the error state, at least transmission chip in the transmitter stops working. As another example, in the error state, at least some key elements in the driver stop working, or the entire driver stops working. For example, after the ranging device enters the error state, the ranging device cannot be switched to the initialization state, the normal state, the standby state, the low power consumption state, or another working state. For example, after the ranging device enters the error state, an error state identifier is identified in the ranging device, and when the error state identifier is detected, the ranging device is prevented from entering another working state.

There may be a variety of switching methods of different working states in the ranging device. For example, different states in the ranging device can be actively switched or automatically switched. Active switching may refer to that the ranging device switches when an instruction from another device is received. Automatic switching may refer to that the ranging device automatically switches when it is determined that a certain condition is met.

In some embodiments, the ranging device can be automatically switched in at least one of the following situations: entering the initialization state, exiting the initialization state, and entering the error state.

In some embodiments, the ranging device can be actively switched in at least one of the following situations: entering the normal state, exiting the normal state, entering the standby state, exiting the standby state, entering the low power consumption state, and exiting the low power consumption state.

In some embodiments, the ranging device can perform at least one of the following operations when a corresponding user instruction is received: entering the normal state from the standby state, entering the standby state from the normal state, switching from the normal state to the low power consumption state, switching from the low power consumption state to the normal state, switching from the standby state to the low power consumption state, and switching from the low power consumption state to the standby state.

In some embodiments, when the ranging device is in the low power consumption state, the ranging device cannot directly enter the normal state from the low power consumption state, but is switched from the low power consumption state to the initialization state, and then enters the normal state from the initialization state. For example, in the initialization state, at least some modules in the ranging device perform self-checking.

In some embodiments, the ranging device switches from the standby state to the low power consumption state when it is detected that it is in the standby state for a certain period of time. For example, the ranging device may be automatically switched from the standby state to the low power consumption state. For example, the ranging device may prompt the user whether it is needed to switch to the low power consumption state when it is detected that it is in the standby state for a certain period of time, and switch from the standby state to the low power consumption state when a switching instruction is received.

In some embodiments, the ranging device is switched from the initialization state to the normal state after startup.

In some embodiments, the ranging device switches to the error state when an error or anomaly is detected. For example, the ranging device may be switched from the normal state or the standby state to the error state. For example, the ranging device enters the initialization state after power-on, and enters the error state when the initialization fails (for example, when the motor fails to start), which can prevent the user from using the ranging device to forcibly start sampling and causing damage to human eyes.

Figure 3:
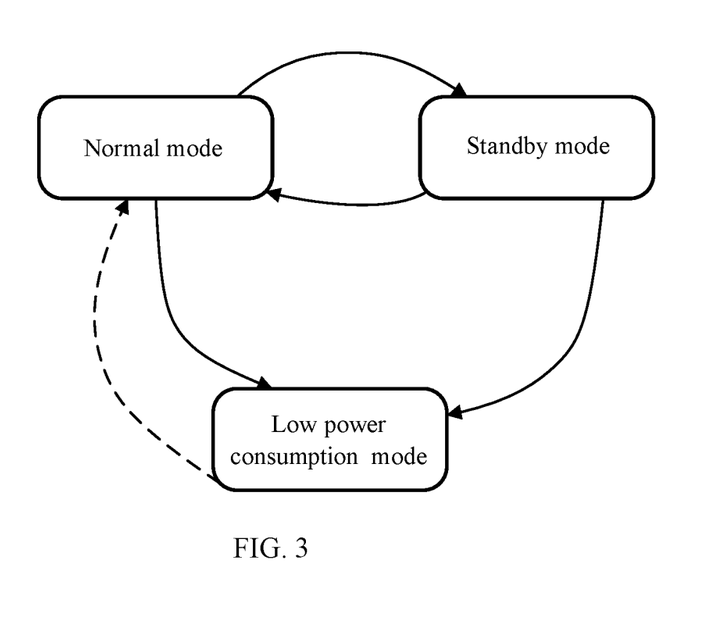
FIG. 3 shows a state diagram according to an embodiment of the present disclosure.

For better understanding, the state and state switching of the ranging device are described below with specific examples in conjunction with FIGS. 3 and 4. As shown in FIG. 3, the user can set three different working modes (working states) to make the ranging device work in different corresponding states. The user may be a device other than the ranging device, such as a control system on a car or another mobile platform. After the setting is successful, the ranging device enters one of a normal mode (normal state), a standby mode (standby state), and a low power consumption mode (lower power consumption state). With the user instruction, the ranging device can switch back and forth between the normal mode and the standby mode. With the user instruction, the ranging device can switch back and forth between the normal mode and the low power consumption mode. With the user instruction, the ranging device can be switched from the standby mode to the low power consumption mode.

Figure 4:
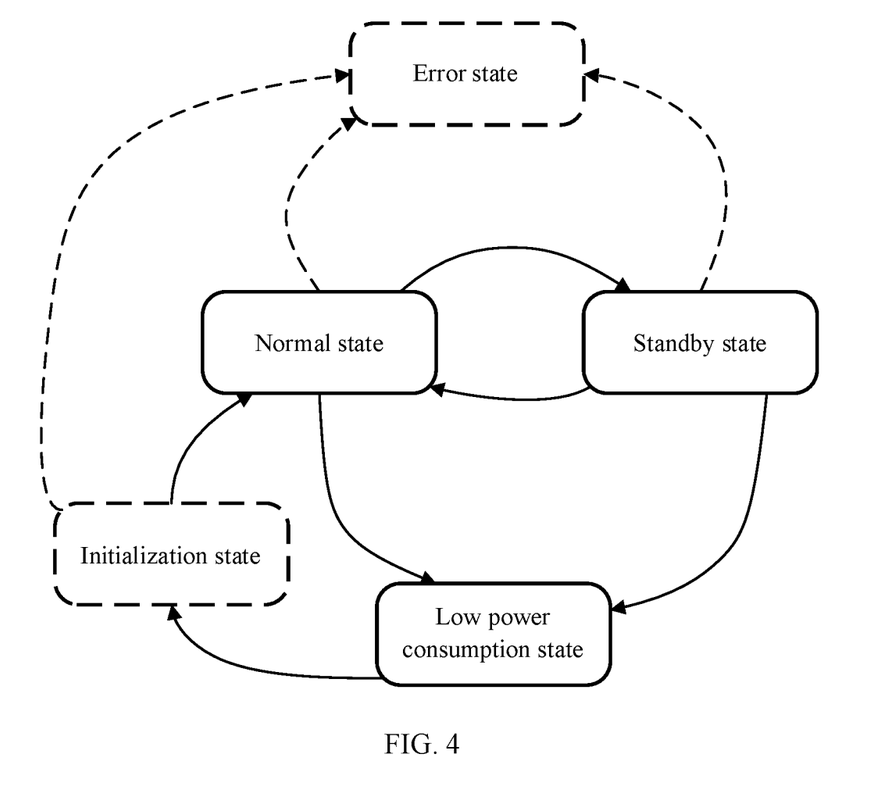
FIG. 4 shows a state diagram according to an embodiment of the present disclosure.

As shown in FIG. 4, the working states of the ranging device also include the initialization state and the error state. When the ranging device switches from the low power consumption state to the normal state based on the user instruction, the ranging device first switches from the low power consumption state to the initialization state, and then switches from the initialization state to the normal state. When an error or anomaly is detected in the initialization state, the normal state, or the standby state, the ranging device enters the error state.

Although the exemplary embodiments have been described herein with reference to the accompanying drawings, it should be understood that the exemplary embodiments described above are merely exemplary, and are not intended to limit the scope of the present disclosure thereto. Those of ordinary skill in the art can make various changes and modifications therein without departing from the scope and spirit of the present disclosure. All these changes and modifications are intended to be included within the scope of the present disclosure as claimed in the appended claims.

Those of ordinary skill in the art may realize that the units and algorithm steps of the examples described in the embodiments disclosed herein can be implemented by electronic hardware or a combination of computer software and electronic hardware. Whether these functions are executed by hardware or software depends on the specific application and design constraints of the technical solutions. Professionals and technicians can use different methods for each specific application to implement the described functions, but such implementation should not be considered beyond the scope of the present disclosure.

It should be understood that, in some embodiments provided by the present disclosure, the disclosed device and method can be implemented in other manners. For example, the example device described above is only illustrative. For example, the division of the modules or units is only a logical function division, and there may be other divisions in actual implementation, e.g., multiple units or components may be combined or integrated into another device, or some features may be omitted or not performed.

In the specification provided here, a lot of specific details are described. However, it can be understood that the embodiments of the present disclosure can be implemented without these specific details. In some embodiments, well-known methods, structures, and technologies are not shown in detail, so as not to obscure the understanding of this specification.

Similarly, it should be understood that in order to simplify the present disclosure and help the understanding of one or more of the various aspects of the disclosure, the various features of the present disclosure are sometimes grouped together into a single embodiment, figure, or description thereof in the description of the exemplary embodiments of the present disclosure. However, the method of the present disclosure should not be construed as reflecting the intention that the claimed disclosure requires more features than those explicitly stated in each claim. More precisely, as reflected in the corresponding claims, the point of the disclosure is that the corresponding technical problems can be solved with features that are less than all the features of a single disclosed embodiment. Therefore, the claims following the specific embodiments are thus explicitly incorporated into the specific embodiments, where each claim itself serves as a separate embodiment of the present disclosure.

Those skilled in the art can understand all features, other than those mutually exclusive, disclosed in this specification (including the accompanying claims, abstract, and drawings) and all processes or units of any method or device disclosed can be employed in any combination. Unless expressly stated otherwise, each feature disclosed in this specification (including the accompanying claims, abstract, and drawings) may be replaced by an alternative feature providing the same, equivalent, or similar purpose.

In addition, those skilled in the art can understand that although some embodiments described herein include certain features included in other embodiments rather than other features, the combination of features of different embodiments means that they are within the scope of the present disclosure and form different embodiments. For example, in the claims, any one of the claimed embodiments can be used in any combination.

The various component embodiments of the present disclosure may be implemented by hardware, or by software module running on one or more processors, or by a combination thereof. Those skilled in the art should understand that a microprocessor or a digital signal processor (DSP) may be used in practice to implement some or all of the functions of some modules according to the embodiments of the present disclosure. The present disclosure can also be implemented as a device program (for example, a computer program and a computer program product) for executing part or all of the methods described herein. Such a program implementing the present disclosure may be stored on a computer-readable medium, or may have the form of one or more signals. Such signals can be downloaded from an Internet website, or provided in carrier signals, or provided in any other form.

It should be noted that the embodiments described above illustrate rather than limit the present disclosure, and those skilled in the art can design alternative embodiments without departing from the scope of the appended claims. In the claims, any reference symbols placed between parentheses shall not be constructed as a limitation to the claims. The present disclosure can be implemented by means of hardware including several different elements and by means of a suitably programmed computer. In the unit claims listing several devices, several of these devices may be embodied in the same hardware item. The use of the words first, second, and third, etc. do not indicate any order. These words can be interpreted as names.

What is claimed is:

1. A ranging device comprising:
a transmitter;
a scanner including an optical element;
a detector; and
a communication circuit configured to receive a control instruction;
wherein working states of the ranging device after power-on include:
a normal state, in which:
the transmitter transmits a light pulse sequence;
the optical element is kept in a motion state to change the light pulse sequence to different directions to emit at different moments; and
the detector receives at least part of reflected light reflected by an object and converts the at least part of the reflected light into an electrical signal, and determines at least one of a distance or an orientation of the object with respect to the ranging device according to the electrical signal;
a standby state, in which:
the transmitter suspends transmitting the light pulse sequence; and
the optical element is kept in the motion state; and
a low power consumption state, in which power of at least one module of the ranging device other than the communication circuit is reduced.

2. The ranging device of claim 1, wherein the ranging device is configured to enter the normal state from the standby state or enter the standby state from the normal state in response to detecting that a switching condition is satisfied.

3. The ranging device of claim 2, wherein the switching condition includes receiving a user switching instruction.

4. The ranging device of claim 1, wherein all modules of the ranging device other than the communication circuit stop working in the low power consumption state.

5. The ranging device of claim 1, wherein the ranging device is further configured to implement at least one of:
in response to receiving a first user instruction, switching from the normal state to the low power consumption state;
in response to receiving a second user instruction, switching from the low power consumption state to the normal state;
in response to receiving a third user instruction, switching from the standby state to the low power consumption state; or
in response to detecting that the ranging device is in the standby state for a certain period of time, switching from the standby state to the low power consumption state.

6. The ranging device of claim 1, further comprising:
a driver configured to drive the optical element to move;
wherein the working states of the ranging device after power-on further include an initialization state, the ranging device being configured to start the driver to move to drive the optical element to move.

7. The ranging device of claim 6, wherein the ranging device is further configured to, in response to receiving a user instruction, switch from the low power consumption state to the initialization state, and then switch from initialization state to the normal state.

8. The ranging device of claim 6, wherein the ranging device is further configured to switch from the initialization state to the normal state after startup.

9. The ranging device of claim 1, wherein the working states of the ranging device after power-on further include an error state, in which the transmitter stops transmitting the light pulse sequence and the optical element stops working, the error state being not able to switch to another one of the working states.

10. The ranging device of claim 9, wherein the ranging device is configured to, in the error state, prevent entry into another one of the working states based on an error state identifier provided in the ranging device.

11. The ranging device of claim 9, wherein the ranging device is configured to switch from the normal state, the standby state, or the initialization state to the error state in response to detecting an error.

12. The ranging device of claim 1, wherein the optical element is configured to change a propagation path of the light pulse sequence and includes a light-emission surface and a light-incident surface that are opposite to and non-parallel to each other.

13. The ranging device of claim 12, wherein the optical element is one of two or three optical elements of the scanner that are arranged side by side along a light path.

14. The ranging device of claim 12, wherein the optical element includes a wedge angle prism.

15. The ranging device of claim 1, wherein:
the detector includes:
at least two reception circuits configured to convert received reflected light reflected by the object into the electrical signal for output;
a sampling circuit configured to sample the electrical signal output by the reception circuit to measure time difference from transmission to reception of the light pulse sequence; and
a computation circuit configured to receive the time difference output by the sampling circuit and calculate distance measurement result;
the transmitter includes at least two emitters corresponding to the at least two reception circuits in a one-to-one correspondence manner; and
each of the at least two reception circuits is configured to receive the reflected light reflected by the object from light pulse emitted by a corresponding one of the at least two emitters.

16. The ranging device of claim 1, wherein the ranging device includes a Lidar.

17. A mobile platform comprising:
a platform body; and
a ranging device mounted at the platform body and including:
a transmitter;
a scanner including an optical element;
a detector; and
a communication circuit configured to receive a control instruction;
wherein working states of the ranging device after power-on include:
a normal state, in which:
the transmitter transmits a light pulse sequence;
the optical element is kept in a motion state to change the light pulse sequence to different directions to emit at different moments; and
the detector receives at least part of reflected light reflected by an object and converts the at least part of the reflected light into an electrical signal, and determines at least one of a distance or an orientation of the object with respect to the ranging device according to the electrical signal;
a standby state, in which:
the transmitter suspends transmitting the light pulse sequence; and
the optical element is kept in the motion state; and
a low power consumption state, in which power of at least one module of the ranging device other than the communication circuit is reduced.

18. The mobile platform of claim 17, wherein the mobile platform includes an unmanned aerial vehicle, a robot, a car, or a boat.

19. A ranging device comprising:
a transmitter;
a scanner including an optical element; and
a detector;
wherein:
working states of the ranging device after power-on include:
a normal state, in which:
the transmitter transmits a light pulse sequence;
the optical element is kept in a motion state to change the light pulse sequence to different directions to emit at different moments; and
the detector receives at least part of reflected light reflected by an object and converts the at least part of the reflected light into an electrical signal, and determines at least one of a distance or an orientation of the object with respect to the ranging device according to the electrical signal; and
a standby state, in which:
the transmitter suspends transmitting the light pulse sequence; and
the optical element is kept in the motion state;
the detector includes:
at least two reception circuits configured to convert received reflected light reflected by the object into the electrical signal for output;
a sampling circuit configured to sample the electrical signal output by the reception circuit to measure time difference from transmission to reception of the light pulse sequence; and
a computation circuit configured to receive the time difference output by the sampling circuit and calculate distance measurement result;
the transmitter includes at least two emitters corresponding to the at least two reception circuits in a one-to-one correspondence manner; and
each of the at least two reception circuits is configured to receive the reflected light reflected by the object from light pulse emitted by a corresponding one of the at least two emitters.

* * * * *